FRUIT PROCESSING MACHINE

Filed July 20, 1962 8 Sheets-Sheet 1

INVENTORS,
MAURICE V. JOHNSON, JR.
DONALD C. SAVAGE
BY Lyon & Lyon
ATTORNEYS

INVENTORS.
MAURICE V. JOHNSON, JR.
DONALD C. SAVAGE
BY Lyon & Lyon
ATTORNEYS

FRUIT PROCESSING MACHINE

INVENTORS,
MAURICE V. JOHNSON, JR.
DONALD C. SAVAGE
BY Lyon & Lyon
ATTORNEYS

FRUIT PROCESSING MACHINE

Filed July 20, 1962

INVENTORS,
MAURICE V. JOHNSON, JR.
DONALD C. SAVAGE
BY
Lyon & Lyon
ATTORNEYS

FRUIT PROCESSING MACHINE

Filed July 20, 1962 8 Sheets-Sheet 5

INVENTORS,
MAURICE V. JOHNSON, JR.
DONALD C. SAVAGE
BY Lyon & Lyon
ATTORNEYS

INVENTORS,
MAURICE V. JOHNSON, JR.
DONALD C. SAVAGE
BY
Lyon & Lyon
ATTORNEYS

INVENTORS,
MAURICE V. JOHNSON, JR.
DONALD C. SAVAGE
BY Lyon & Lyon
ATTORNEYS

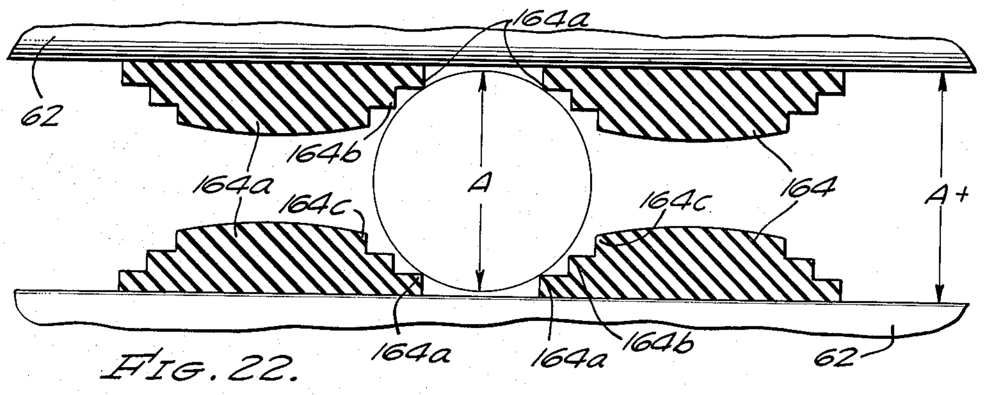
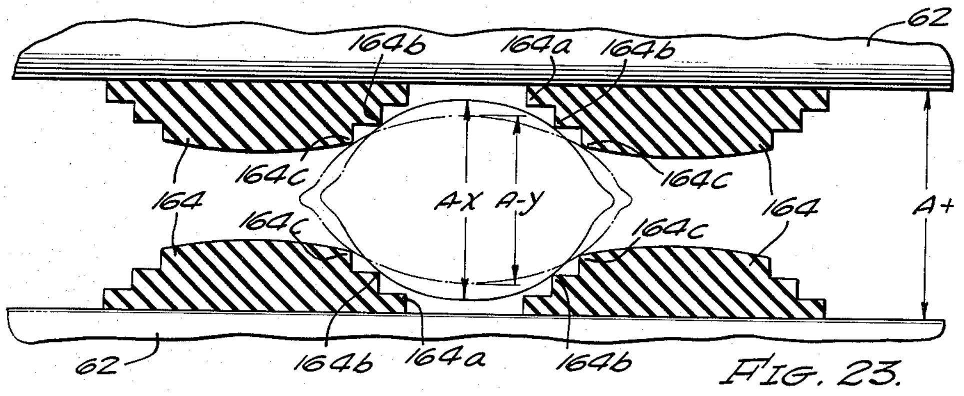
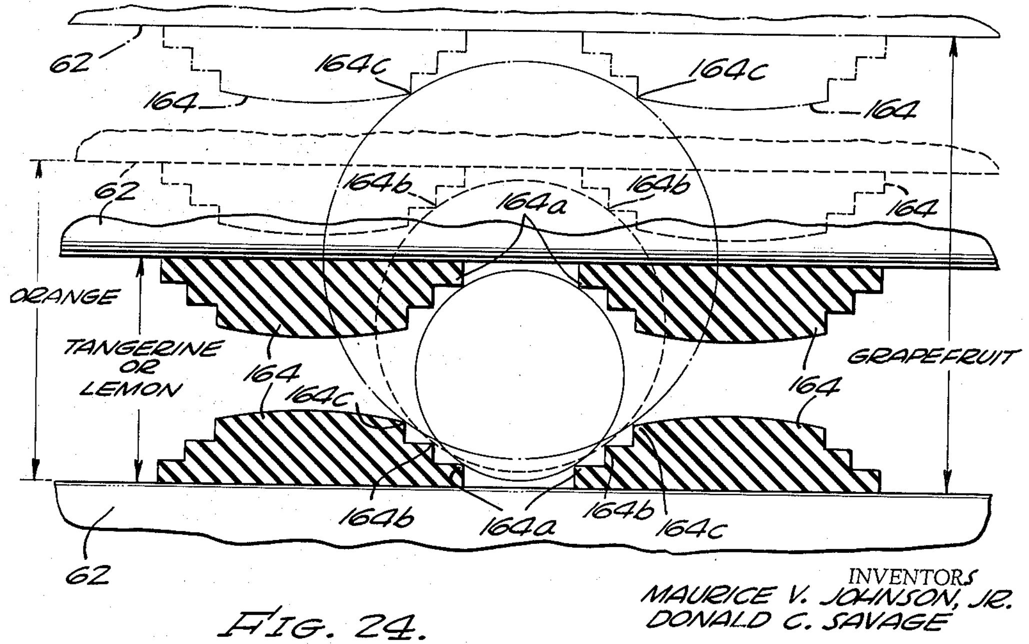
FIG. 24.
INVENTORS
MAURICE V. JOHNSON, JR.
DONALD C. SAVAGE United States Patent Office 3,244,276
Patented Apr. 5, 1966

3,244,276
FRUIT PROCESSING MACHINE
Maurice V. Johnson, Jr., Upland, and Donald C. Savage, Ontario, Calif., assignors to Sunkist Growers, Inc., Los Angeles, Calif., a corporation of California
Filed July 20, 1962, Ser. No. 213,841
8 Claims. (Cl. 209—106)

This application is a continuation-in-part of our copending application, Serial No. 719,297, filed March 5, 1958, for Fruit Processing Machine, now abandoned.

The present invention relates generally to an improved sizing and printing machine for citrus fruits and the like, and more especially to a machine of this character having sizing elements of improved design which result in a more uniform and more effective sizing of fruit over a wider range of sizes and shapes.

It is a general object of this invention to provide a machine which will take articles, such as fruit or the like, at random, and orient, print, and size the fruit as a continuous operation.

While fruit and vegetables each have a general characteristic shape, they are each subject to considerable variation in both size and shape. This is particularly true of citrus fruits, to which the present machine is especially adapted; though it will be realized that in the broader aspects of the invention, the present machine is not limited to use with citrus fruit.

In retail selling of citrus fruit, it is desired that all fruits of one grade appear to have substantially the same size. Taking lemons as an example, in the past lemons have been gauged and classified primarily on the basis of their diameter taken at right angles to the long axis of the fruit running from the blossom end to the stem end. When fruit is classified on this basis, elongated fruit of the same diameter as spherical fruit appears to be much larger because of the increased length; and in fact, such longer fruit does have a volume greater than the spherical fruit. It has been found that fruit which has the same general appearance of being of the same size can actually vary somewhat in diameter, length, and projected area. The eye normally takes into account all these individual factors and the fruit that is classified on the basis of any one factor alone will not all visually appear to be of the same size. Hence, it is a further object of the invention to provide a sizing machine which will more accurately size citrus fruit, such as lemons, not only with respect to their diameter but also with respect to their lengths or general shape.

Sizing of lemons can be carried out with machines employing a plurality of spaced, parallel sizing rolls, one machine sorting lemons fed into the machine at random into a plurality of different size categories. The commercial range of sizes for oranges is different than for lemons, as it includes the full range of sizes for lemons and then extends beyond to fruit of larger dimensions. The same is true of grapefruit, since this larger fruit includes all the range of sizes for both oranges and lemons and then extends to include larger fruit. Accordingly, it is also an object of the present invention to provide a machine which is adaptable to efficient sizing of all these different citrus fruits using the same sizing rolls.

A further object of this invention is to provide a machine wherein the fruit is properly oriented and then printed, the fruit being reoriented for sizing to correct any displacement of the fruit as a result of the printing operation.

Still a further object of this invention is to provide a machine wherein balanced forces are applied to the conveyor during sizing, minimizing wear and damage to the machine.

The various objects and advantages of the present invention will be more readily understood by reference to the following description, and to the drawing, in which:

FIG. 22 is a fragmentary section of two successive sizing rollers provided with a modified form of sizing sleeve illustrating diagrammatically the sizing action with spherical fruit;

FIG. 23 is a view similar to FIG. 22 illustrating the sizing action with respect to elongate fruit of reduced diameter, but with the same roller spacing as in FIG. 22; and FIG. 24 is a diagrammatic view similar to FIG. 22 illustrating the sizing action with fruit of different diameters requiring different transverse spacings of the sizing rollers.

Figure 1:
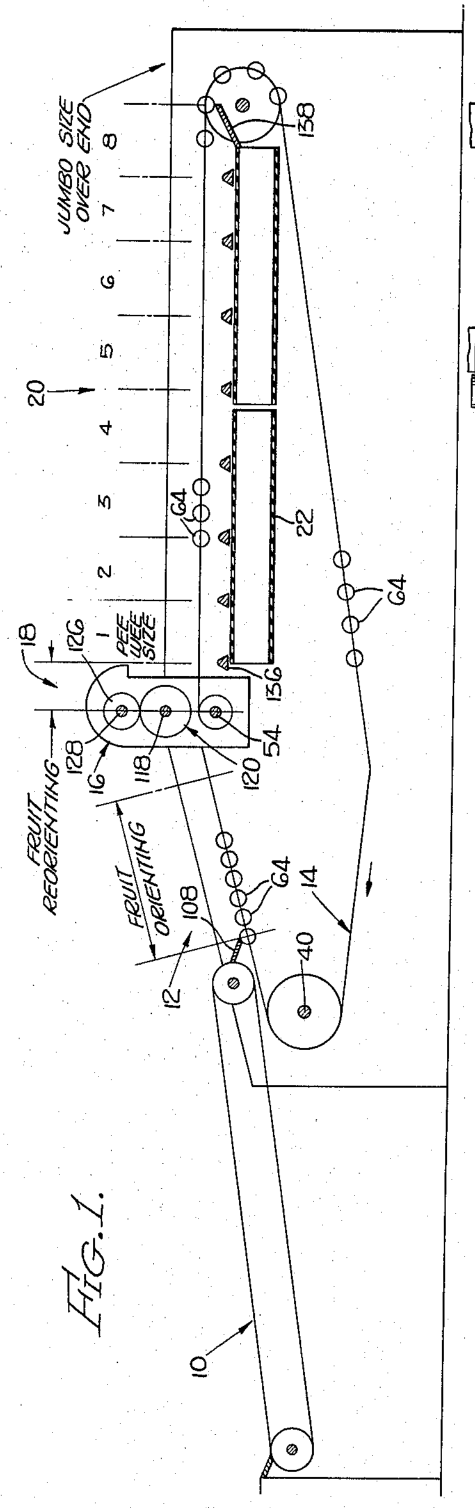
FIG. 1 is a diagrammatic side elevation of the machine embodying the present invention.

Referring now to the drawings, and particularly to FIG. 1, fruit such as lemons are supplied to a belt conveyor 10 at random. This conveyor moves the lemons to the right in FIG. 1 and spills the lemons at the upper end of conveyor 10 onto the orienting zone 12 of the travel of the orienting and sizing conveyor 14. During travel through orienting zone 12 between discharge from feed conveyor 10 and printer 16, the lemons are singularized and aligned on conveyor 14 preparatory to printing. As the fruit further progresses beneath the printer, it is printed with the desired indicia or trademark.

After passing the printer 16, the fruit enters reorienting zone 18 wherein any displacement of the fruit caused by the printing operation is corrected. As conveyor 14 continues to advance the fruit, the fruit passes through a sizing zone 20 wherein the fruit supporting rollers, comprising sleeves 64 on shafts 62, are separated in a direction transverse to their axes so that the smallest fruit passes first between shafts 62 onto a discharge belt conveyor as generally indicated at 22. The fruit thus discharged increase in size with increased length of travel through sizing zone 20 and increase of distance from the printer, with the largest lemons being discharged farthest removed from the printer. In this manner, lemons may be singularized, oriented, printed and sized in a single operation.

Figures 3, 4:
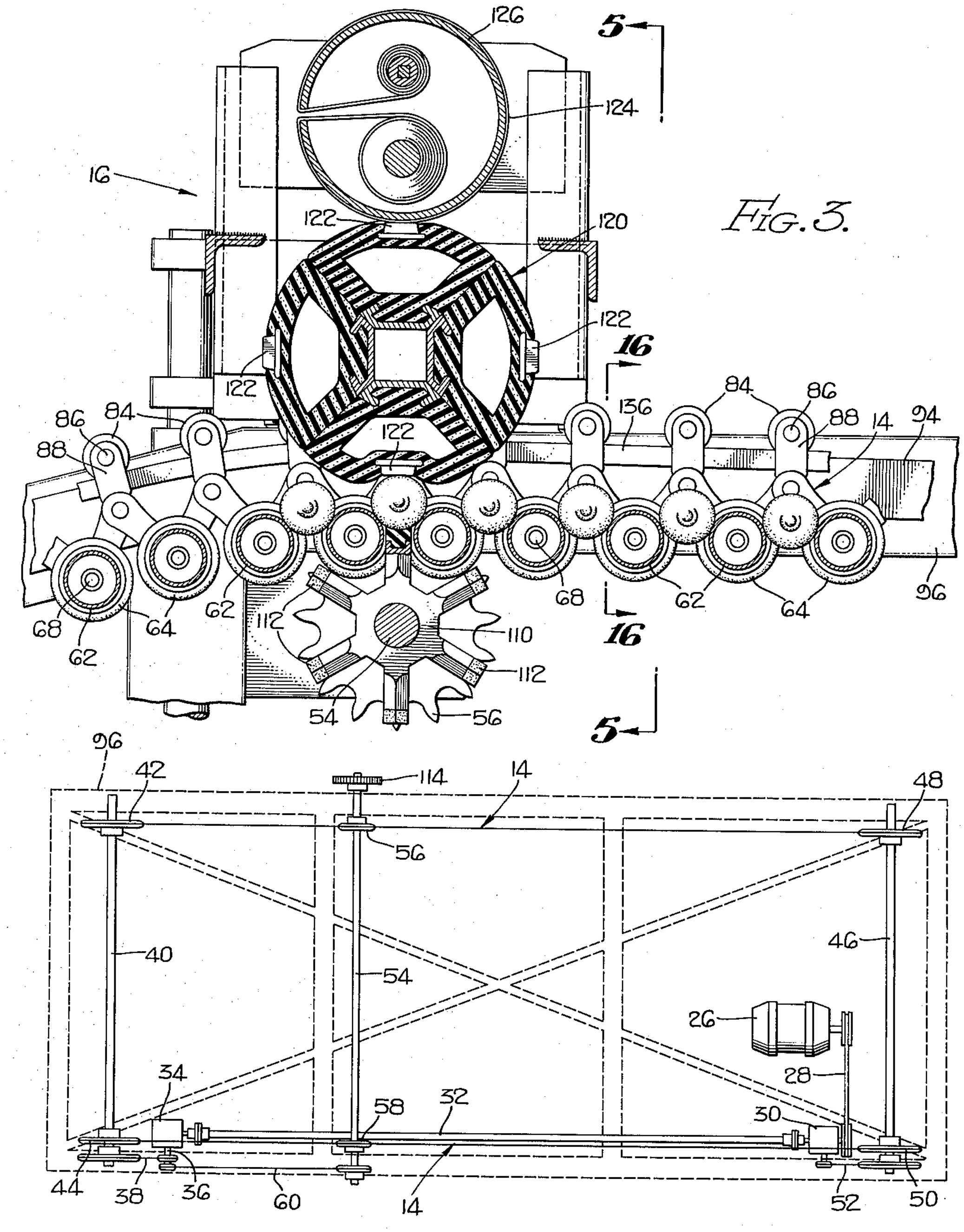
FIG. 3 is a fragmentary side elevation partially in section of the printing mechanism.
FIG. 4 is a diagrammatic view of the driving mechanism for driving the endless conveyor.

Conveyor 10 may be of any conventional type and of the same width as the orienting and sizing conveyor 14; and it is driven by any suitable source of power. Conveyor 14 is driven by motor 26 (see FIG. 4) which drives, through belt 28 and gear reduction box 30, a shaft 32 which in turn, through a second gear box 34, drives shaft 36. Chain 38 driven by shaft 36 drives a front drive shaft 40 extending transversely of the machine frame 96. Shaft 40 carries adjacent either end thereof a sprocket 42 and 44, respectively, which mesh with and drive the orienting and sizing conveyor 14 at one end thereof, as will become apparent. A second drive shaft 46 is positioned at the opposite end of conveyor 14 and has a pair of sprockets 48 and 50 mounted thereon and rotated thereby, which sprockets likewise mesh with and drive conveyor 14 at a point spaced from the first mentioned pair of sprockets. Shaft 46 is driven by chain 52 from a second output shaft of gear box 30.

A third drive shaft 54 has a pair of sprockets 56 and 58 thereon which mesh with and drive conveyor 14. Shaft 54 is driven by chain 60 from shaft 36. Thus, conveyor 14 has three synchronously driven power sources which function to advance the conveyor at the desired rate with a minimum of stress within the conveyor.

Conveyor 14 is formed chiefly by a plurality of parallel, hollow shafts 62 spaced transversely from one another and which are mounted on the conveyor by a plurality of spaced axles 68, each axle carrying a resilient shaft supporting ball bearing insert 66. At each end of each shaft 62 an insert 66 is located therein, as shown particularly in FIG. 21, the outer race of insert bearing 66 being non-rotatively attached to the hollow shaft 62. The inner race of the insert bearing is attached to axle 68 by set screw 70 so that the balls 71 permit rotation of shaft 62 relative to axle 68. Pivotally mounted upon each axle 68 is a pair of outer arms 72 and 74, sleeve 76 being rotatably mounted upon the axle between the arms 72 and 74. A second pair of arms, inner arms 78 and 80, is secured to sleeve 76; and they are held apart by a spacer roller 82 which rotates on sleeve 76 and fills the space between the two arms 78 and 80.

Figures 15, 16, 17, 21:
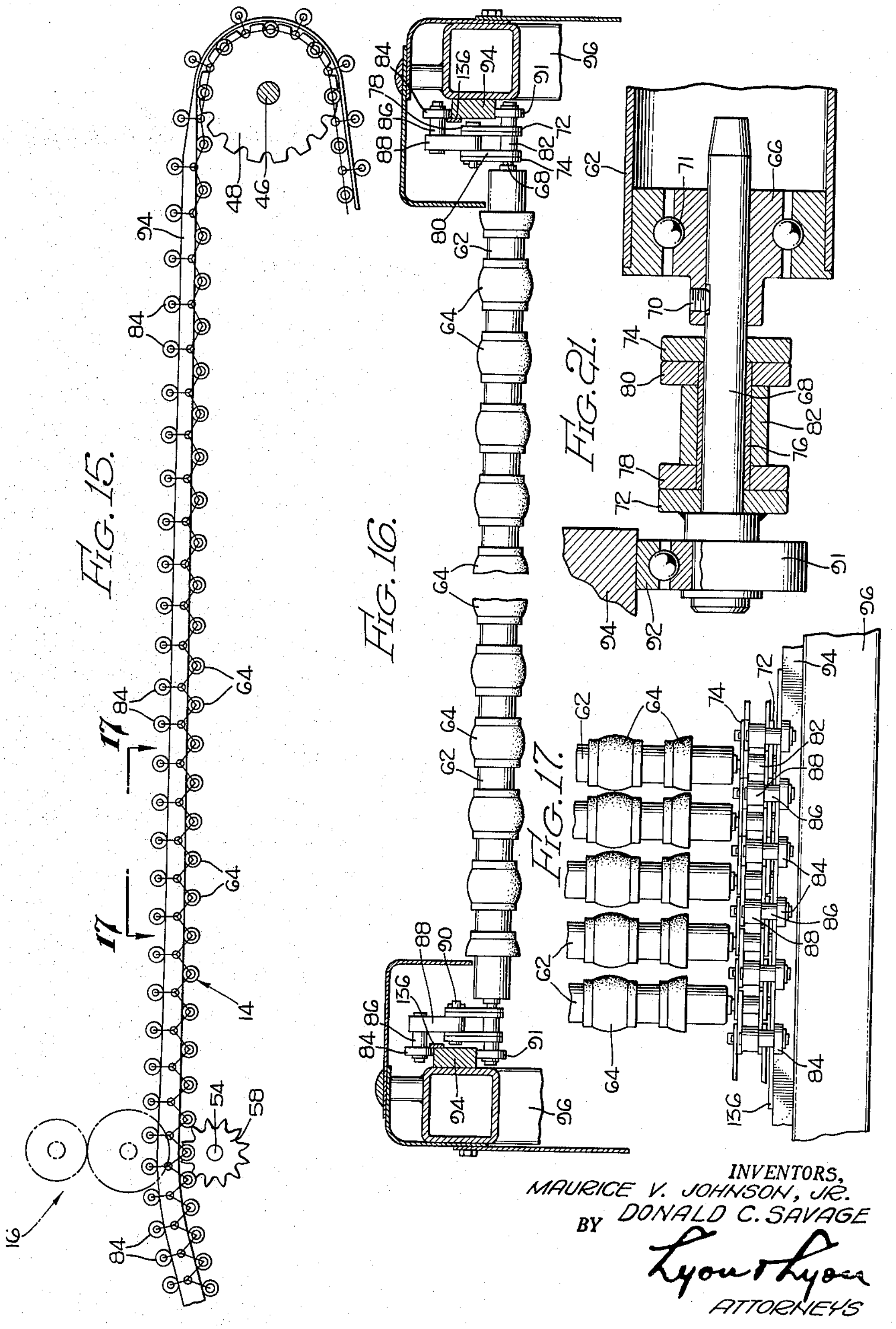
FIG. 15 is a diagrammatic view illustrating the spreading movement of the rollers in the endless conveyor to effect sizing of the fruit.
FIG. 16 is a combined vertical section and elevation on line 16—16 of FIG. 3.
FIG. 17 is a fragmentary plan view along line 17—17 of FIG. 15.
FIG. 21 is a fragmentary vertical section on line 21—21 of FIG. 20.

Secured to each outer arm 72, as shown in FIG. 21, is a ball bearing indicated generally at 91. Ball bearing 91 has an outer race 92 which serves as a cam follower in the form of a roller bearing against one face of cam 94. Cam track 94 is supported by frame 96 of the machine and extends horizontally at each side of the machine parallel to the general path of conveyor 14.

Figures 13, 14:
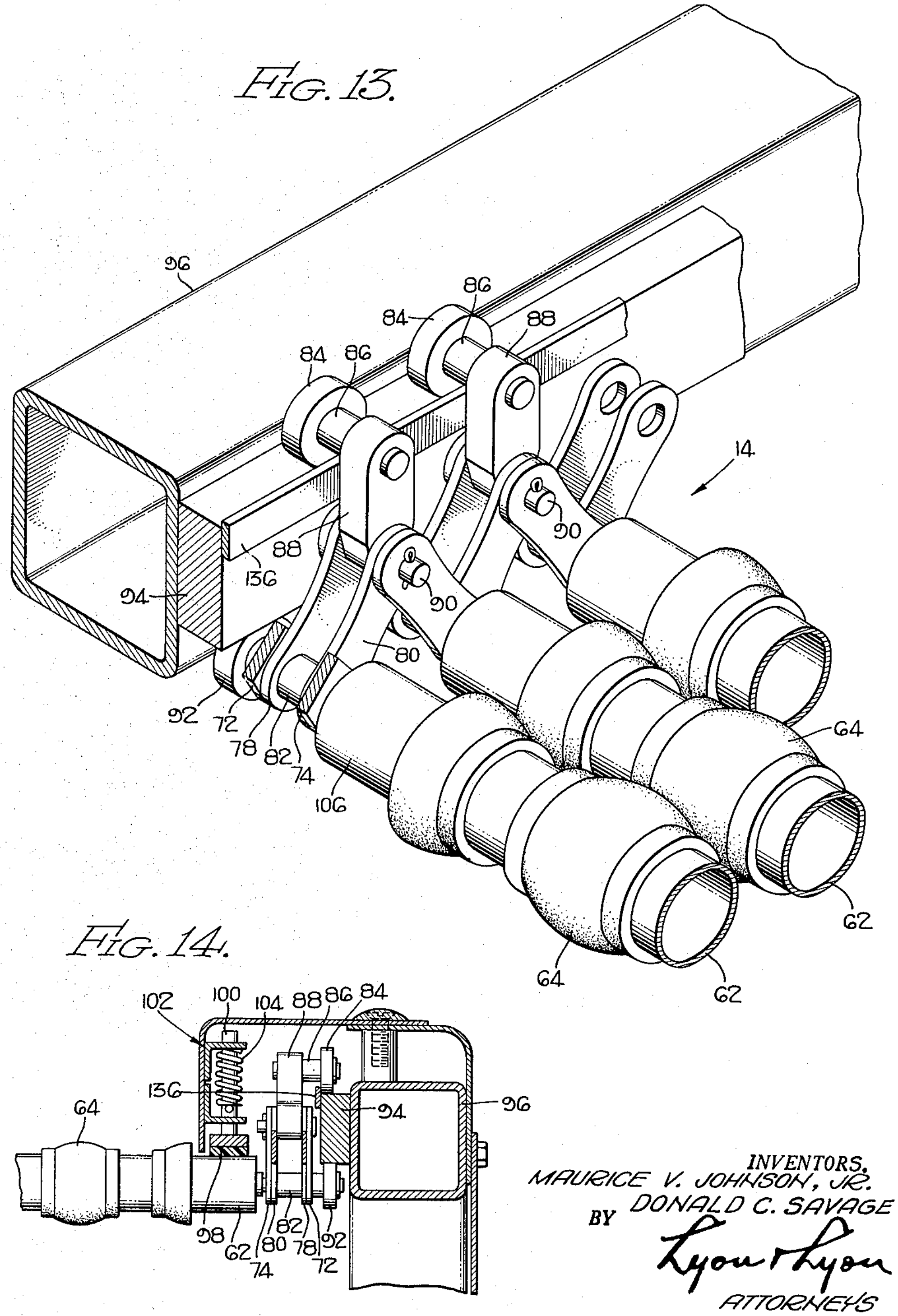
FIG. 13 is a fragmentary perspective of a portion of the sizing rollers.
FIG. 14 is a fragmentary section on line 14—14 of FIG. 2.

A second set of cam followers is provided in the form of a plurality of rollers 84 each mounted upon a shaft 86, as shown in FIG. 13, each shaft 86 also carrying a depending link 88. Each link 88 is pivotally secured by a pin 90 to the upper ends of the pair of inner arms 78 and 80 connected to one shaft 62 and the upper ends of the outer arms 72 and 74 connected to the next adjacent shaft 62. Thus, each link 88 is located between and at one side of a pair of shafts 62 at the extremities thereof, as shown particularly in FIG. 13. In this manner, each horizontally extending shaft 62 of the conveyor is pivotally mounted on the conveyor, being free to turn about its supporting axles 68 and also being rotatably mounted with respect to the adjacent shafts 62 at either side thereof.

Cam 94 provides upper and lower faces against which the cam followers 84 and 92 bear, respectively, as may be seen in FIG. 13. Thus, the lateral spacing between successive shafts 62 can be governed by controlling the vertical spacing between a pair of rollers 92 and the intermediate roller 84 bearing against two faces of cam 94. For this purpose, the width, that is the vertical dimension, of cam 94 is varied as will be described later. FIG. 13 discloses the cam track and followers at one side of conveyor 14, that is at one end of rollers 62; and it will be realized that a duplicate arrangement of cam track and followers is provided at the opposite end of rollers 62 along the opposite side of conveyor 14.

Figures 18, 19:
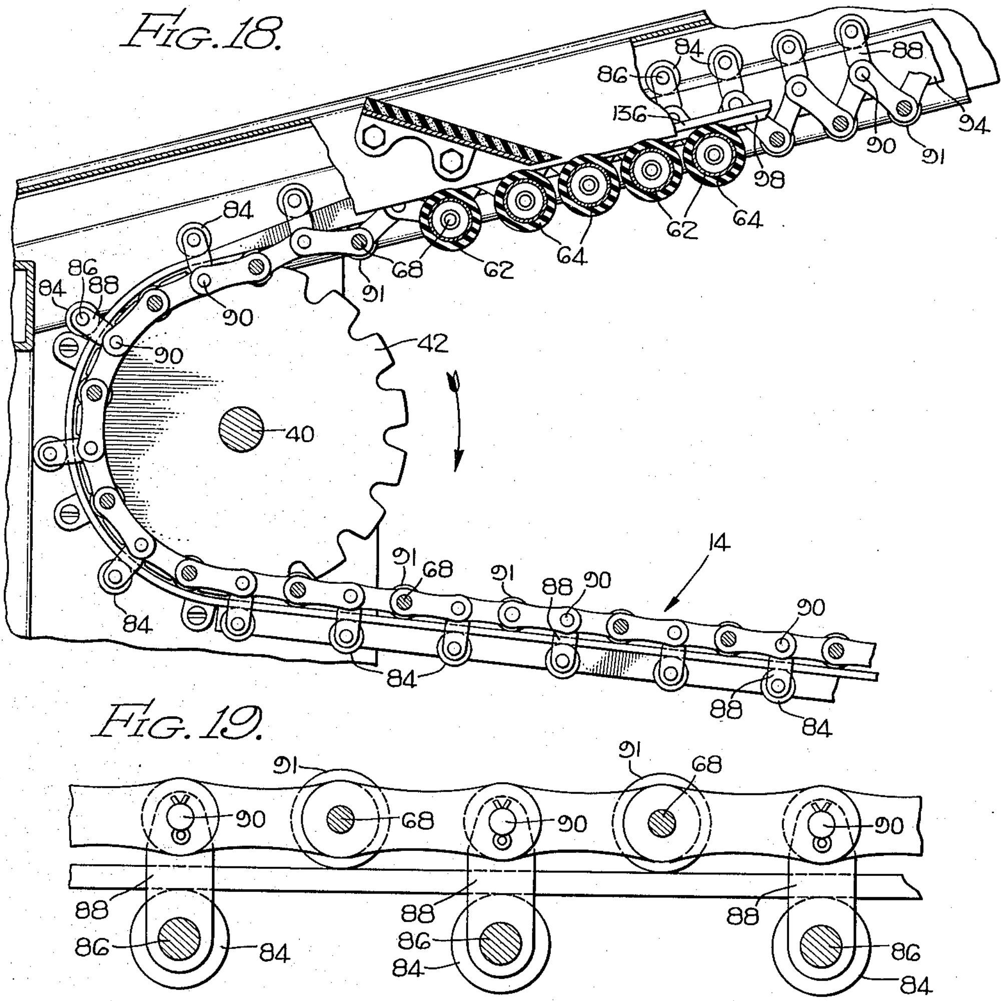
FIG. 18 is a fragmentary side elevation, partly in section, of a drive sprocket driving the endless conveyor and sizing mechanism.
FIG. 19 is an enlarged view of the sizing rollers showing positions occupied during the return path.
Figure 20:
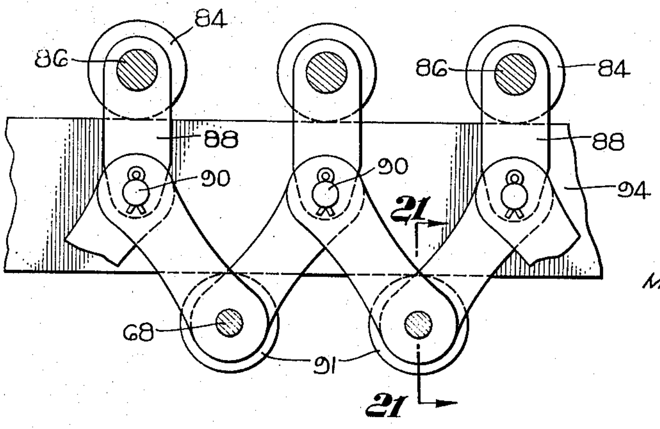
FIG. 20 is an enlarged view of the sizing rollers showing positions occupied at the beginning of the sizing path.

Sprockets 42, 44, 48 and 50 have inwardly extending slots around their peripheries which enable these sprockets to engage both rollers 82 in the chain and links 88 when the linkage at the side of the conveyor is in the extended condition as shown in FIG. 18. When, due to the compressed condition of the conveyor as occurs in the upper run of the conveyor, sprockets 56 and 58 engage only rollers 82 and the spacing of the slots in the sprocket is changed accordingly. Rotation of the drive sprockets provide three points at which the conveyor is continuously advanced.

During the orienting portion 12 of conveyor travel, the cams 94, are relatively wide, the relatively large vertical cam dimension keeping shafts 62 close together so that none of the lemons can pass between adjacent shafts. Lemons from feed conveyor 10 fall onto the upper surface of conveyor 14 and lodge in pockets therein. These pockets are each formed by a group of four sleeves 64 on shafts 62. Two of these sleeves are successive sleeves on a shaft 62 and the other two are a similar pair of successive sleeves mounted on the next adjacent shaft 62. Sleeves on two adjacent shafts are aligned transversely of the shafts 62 as shown in FIG. 17. The sleeves 64 are formed of a suitable resilient material, for example rubber, and are preferably axially spaced from one another along each shaft 62. This arrangement is preferred in order to enable easy replacement of the fruit engaging means when worn and for other reasons that will become apparent; but otherwise it will be understood that the shafts and sleeves can be made integral with each other and perform in the same way.

Sleeves are the elements that directly engage and support the fruit, and each sleeve has one or more shoulders, each providing an annular ridge extending around the sleeve. Engagement with each fruit is a localized contact approaching a point or a line contact at these ridges, as may be seen in FIGS. 11 and 12. Contact of a sleeve with the fruit is substantially limited to an annular ridge.

Each sleeve 64 is aligned transversely, that is, longitudinally of conveyor 14, with sleeves on adjoining shafts. Hence, two successive sleeves on one shaft cooperate with the two corresponding sleeves on the adjoining shaft and are quadrilaterally related to form a fruit receiving pocket in which a lemon or the like is supported at four contacts, one on each of the four sleeves (FIGS. 7, 8, 9, 11 and 12). Since the ridges on the sleeves are aligned transversely of the shafts, the four positions of support of the fruit are located two in each of two parallel planes that are vertical and extend transversely of the longitudinal axis of the fruit, that is, the axis extending from the bud end to the stem of the lemon.

Shafts 62 are rotated during their travel through orienting zone 12 in order to orient the lemons in the pockets thus formed, and to place in the pockets any lemon which may not have previously fallen into such a pocket. For this purpose, a track 98 (FIG. 14) is mounted upon vertically extending pins 100, each of which projects through two suitable holes in the arms of each fork of a bracket 102 suitably secured to machine frame 96. A coil spring 104 surrounding pin 100 has its lower extremity secured to pin 100 and its upper extremity bears against the inner surface of the upper fork of bracket 102 whereby track 98 is normally urged to its lowermost level and into engagement with rollers 62. Track 98 is spaced from frame 96 so that it engages the end portion of each shaft 62 between the end sleeve 64 on the shaft and arm 74. This area of engagement of track 98 with the rollers is designated at 106 in FIG. 13.

A similar track is provided at the opposite extremity of shaft 62 and the two tracks frictionally engage and rotate the shafts independently of each other as they pass beneath the tracks 98. This rotation of shatfs 62 and sleeves 64 rotates and displaces the lemons as they fall from conveyor 10 onto shafts 62 until the lemons fall into the pockets between four adjacent sleeves with their long axis parallel to that of shaft 62 (see FIGS. 7 through 12). To facilitate this orientation process, the orienting path is inclined as seen in FIG. 1. Thus, as lemons are delivered from conveyor 10 they are delivered at a rate designed to supply slightly fewer lemons than the number of pockets passing the end of delivery conveyor 10 so that there will always be an excess number of fruit receiving pockets provided by the conveyor 14.

Rotation of shafts 62 plus the inclination of the conveyor during the orienting phase of travel singularizes the lemons with any excess lemons remaining against baffle 108 until a pocket is available therefor. Once a lemon is within a pocket, continued rotation of shafts 62 tends to shift the fruit around until it reaches the lowest possible level in the pocket and is oriented with its axis parallel to the axes of the shafts.

Figures 5, 7, 11, 12:
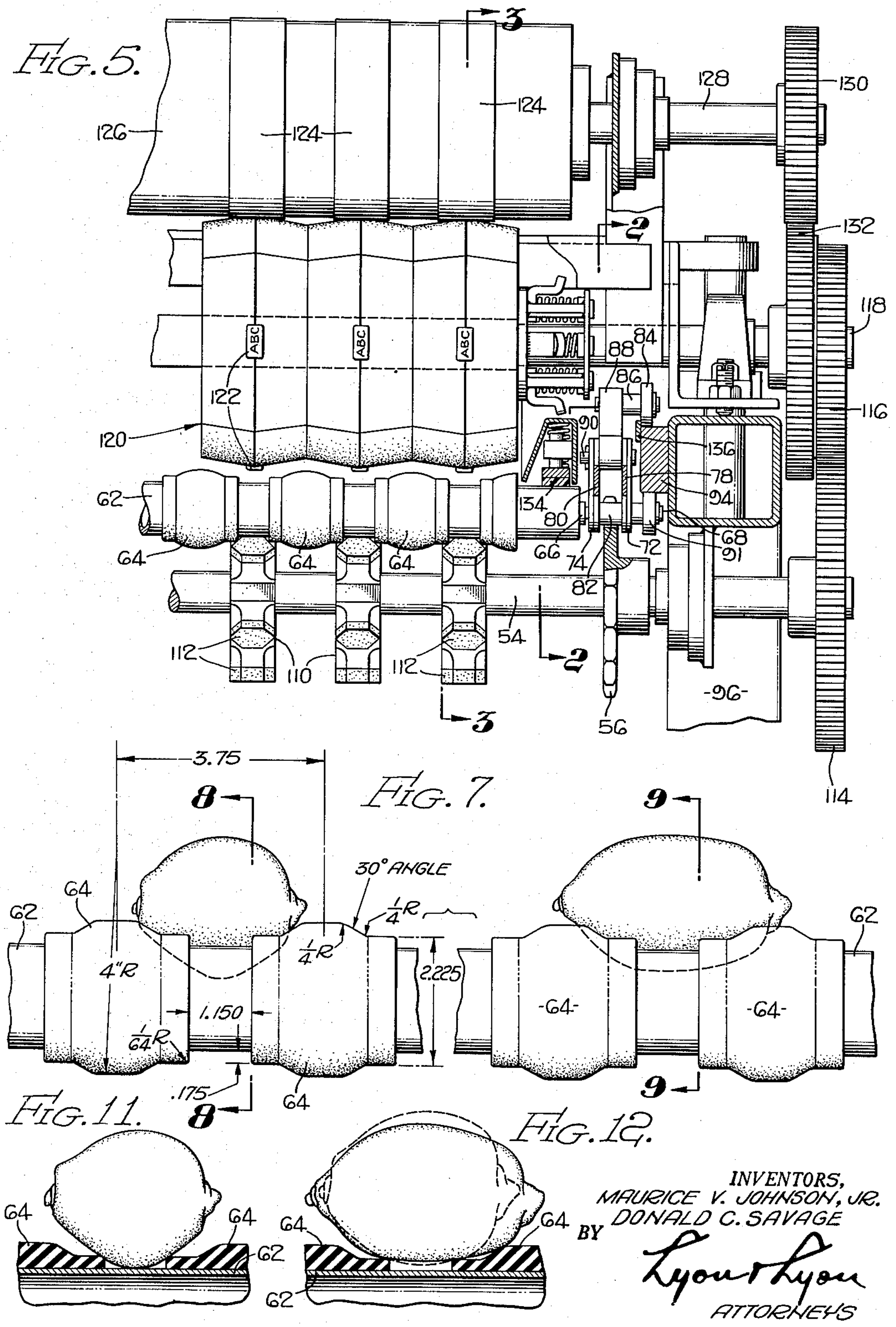
FIG. 5 is a fragmentary elevation and section along line 5—5 of FIG. 3.
FIG. 7 is an elevation of a section of a single sizing roller illustrating diagrammatically the operation of the roller in fruit sizing.
FIG. 11 is a fragmentary section taken along line 11—11 of FIG. 8.
FIG. 12 is a fragmentary section taken along line 12—12 of FIG. 9.
Figure 6:
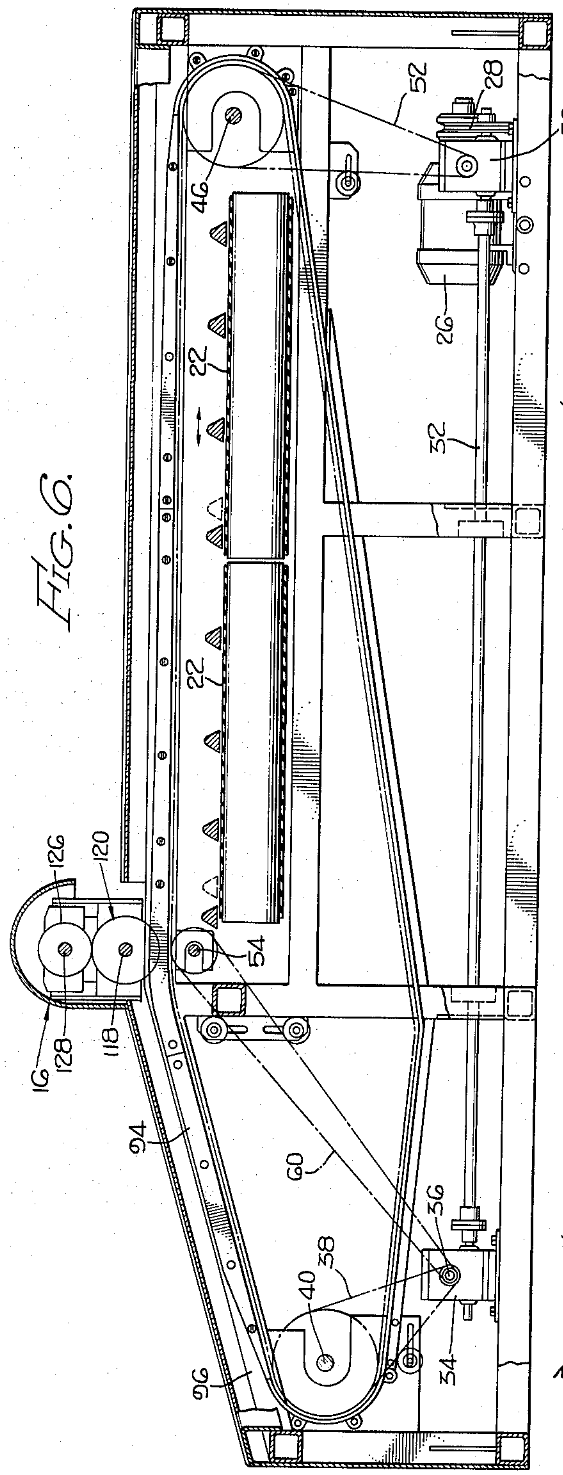
FIG. 6 is a side elevation of the machine with parts of the frame broken away.
Figure 10:
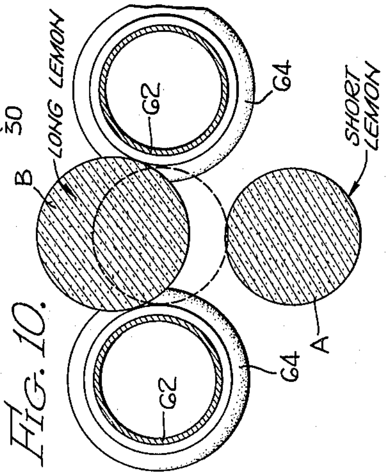
FIG. 10 is a view similar to FIG. 9 illustrating diagrammatically the sizing of fruit according to diameter of the fruit.
Figure 9:
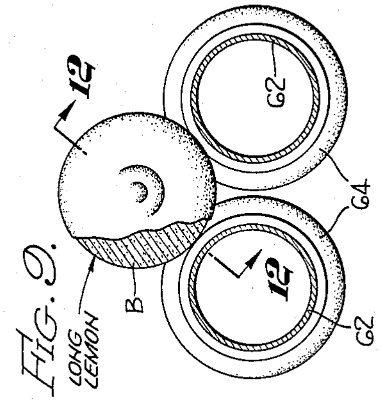
FIG. 9 is a fragmentary section and elevation along line 9—9 of FIG. 7.
Figure 8:
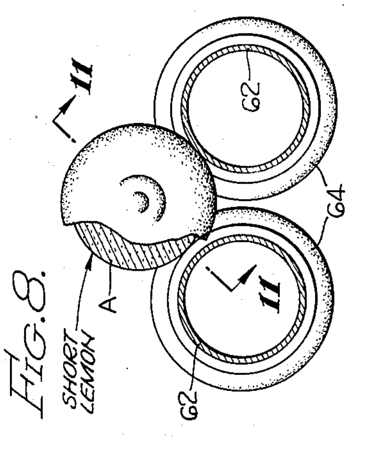
FIG. 8 is a fragmentary section and elevation along line 8—8 of FIG. 7.

FIGS. 7 and 8 show each sleeve has at least one substantially cylindrical end portion terminating at a generally planar, radial surface. The intersection of these two surfaces forms a right angular fruit engaging and supporting ridge spaced radially outwardly from the surface of shaft 62 (FIG. 11). The fruit engages and is supported by two such ridges on two successive sleeves on one shaft and by two similarly related ridges on an adjoining shaft. The radial surfaces of the sleeves are aligned in the direction of fruit advance, thus each fruit is supported by four sleeves at four contact positions located in two fixed, parallel planes normal to the shafts. In the fully oriented position when the fruit is at the lowest level in the pockets, each fruit is engaged at two locations along its length of substantially equal diameters of the fruit. This is a position of relative stability of a fruit in a pocket because the fruit is then rotated at the same speed at both ends. If one end turns faster, the fruit rides up on a sleeve and then shifts axially ultimately to arrive at a stable position in a pocket. Since any fruit, such as lemons may be round or elongated, large or small, sleeves 64 have been designed to handle a maximum of shapes and sizes.

From a comparison of FIGS. 11 and 12, it will be seen that as the fruit changes from a generally spherical shape to an elongated or prolate shape, each fruit is still supported at the same positions on the sleeves. Thus, these four support positions remain fixed with respect to the major diameter of the fruit, regardless of the size and shape of the fruit.

In the simplified form of the invention, each of sleeves 64 has only a single ridge as the fruit engaging and supporting means. Preferred dimensions for sleeves of this character are given, but without limitation to these exact dimensions since in its broader aspects the present invention is not limited by these dimensions. In this embodiment, the sleeves are axially spaced 1.15 inches between radial end surfaces of successive sleeves with the centers of two successive sleeves 3.75 inches apart. The diameter of the cylindrical ends of the sleeves is about 2.225 inches. Each sleeve is provided with a raised central portion having a diameter of approximately 2.6 inches formed by a 30° inclination connected at one extremity by a section of about ¼ inch radius to the cylindrical end surfaces of the sleeve and at the opposite extremity by a section of about ¼ inch radius to the center portion which preferably has a radius of about 4 inches. This configuration provides accurate sizing for commercial purposes both with respect to diameter and length of the fruit.

After the lemons have thus been singularized and oriented in the pockets on the conveyor so that each lemon is in a pocket with its long axis parallel to shafts 22 normal to the direction of travel of conveyor 14, the lemons are passed beneath printer 16. The printer illustrated is fully described in Patent No. 2,987,991, issued June 13, 1961, entitled Printing Machine. Only the principal parts have been illustrated herein, thus the rotary platens 110 are mounted on shaft 54 and have resilient tipped spokes 112 which project between adjacent sleeves to support the fruit during printing. A spur gear 114 is mounted upon shaft 54 which meshes with gear 116 mounted upon shaft 118 upon which rotary printing drum 120 is mounted. The drum has printing dies 122 strategically located in its periphery and a resilient mounting for each die. Thus, as a die 122 contacts a lemon to print the desired indicia thereon, the fruit is at this instance supported by one of the spokes 112. Ink is provided for dies 122 from ribbons such as 124 which are reeved around drum 126 mounted upon shaft 128 bearing spur gear 130 which meshes with gear 132 on shaft 118. For further details of the printing device, reference may be made to the above identified patent.

Figure 2:
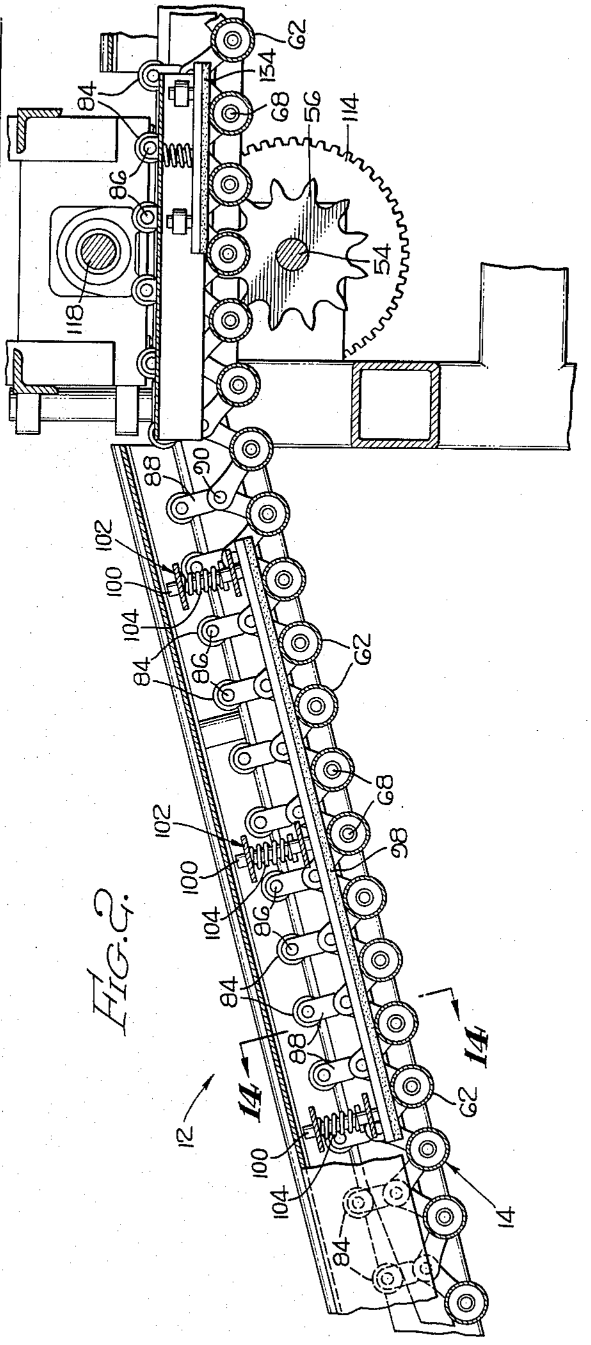
FIG. 2 is a fragmentary side elevation partially in section of the orienting mechanism.

After passing under the printer, some of the lemons may be shifted within or displaced from the supporting pockets on the conveyor. In order to reorient such lemons, a track 134 (see FIG. 2) is provided, which is identical to track 98 except shorter in length, to frictionally engage and rotate shafts 62 as the fruit passes through the reorienting zone 18. Thus, the second means for rotating the shaft during a portion of the conveyor travel is located at a position following the printing station in order to reorient fruit that may have been displaced as a result of the printing operation.

After the lemons pass through this reorienting zone 18, the cam 94 is gradually reduced in its vertical width to permit link 88 to approach shafts 62. It will be seen in FIG. 13 that a link 88, a pair of inner arms 78 and 80 and a pair of outer arms 72 and 74 connected to the link at pin 90, form a pivotally connected Y-shaped structure. As cam 94 becomes narrower, the followers 84 and 92 are allowed to approach each other, permitting the arms of the Y formed by the inner and outer arms, to make a greater angle with one another. The pivotal connection of these elements allows the inner and outer arms connected to adjacent shafts 62 to pivot with respect to each other to increase the distance between the axes of successive adjacent shafts 62, as the conveyor 14 moves along cam 94. As shafts 62 move apart, the spacing between them becomes greater until the smallest lemons fall between the shafts. By regulating the rate of reduction of thickness of cam 94, the rate of increasing the space between two successive shafts 62 can be controlled so that different sizes of lemons are delivered at successive stations along conveyor 22, which stations are delineated by guide rails 136 which extend for the length of conveyor 22. In this embodiment, the shafts 62 spread far enough apart to permit passage therebetween of the largest or jumbo size lemons, and these spill onto conveyor 22 before the sizing conveyor 14 passes over sprockets 48 and 50, with baffle 138 which extends the width of both conveyors 14 and 24 guiding the lemons onto conveyor 22. The partitions or guide rails are preferably mounted for movement relative to one another to permit varying the sizes of the fruit which fall between an adjacent pair. Lemons vary substantially in size and configuration. Thus, lemons of the same diameter may be round or elongated, likewise lemons of the same volume may be round or elongated.

The sleeves 64 are so shaped that elongated lemons of a given diameter are classified with round lemons of a greater diameter in order that they have the visual appearance of being uniformly sized. By varying the size, dimensions, and spacing of the sleeves, the sizing operation can be modified to classify elongate lemons with round lemons of the diameter desired.

In order to provide sizing rolls capable of accommodating a greater range of sizes and shapes of fruit, from lemons to grapefruit, the shafts 62 have been provided with a modified form of sleeve having at each end a fruit engaging and supporting conformation consisting of a plurality of annular shoulders or ridges, as may be seen in FIGS. 22, 23 and 24. In these figures there is illustrated a three-step sleeve 164 mounted on shafts 62. Assuming that the spacing between two successive shafts is based on the desired size of spherical fruit having a diameter A, the minimum spacing between two successive shafts is then A or slightly greater and is indicated in the drawing as A plus. Under these conditions, the spherical fruit engages and is sized by the annular ridges **164*a* which are closest to shaft 62. These same ridges also engage and size smaller oblate fruit. However, as the fruit size increases, particularly with reference to the length, the second and third shoulders 164*b* and 164*c* come into play successively. Thus, shoulder 164*b* engages and sizes slightly prolate fruit indicated in full lines in FIG. 23. Here the diameter of the fruit has been reduced by a certain amount and is indicated to be equivalent to $A-x$. However, this fruit is visually of the same size as spherical fruit having the diameter A since this fruit is slightly longer and, therefore, has approximately the same volume. As the diameter of the fruit decreases to a value $A-y$, the degree of elongation increases and the more prolate fruit is then gauged on the third annular shoulders 164*c*** as indicated by the fruit in dot-dash lines in FIG. 23.

FIGS. 22 and 23 illustrate how an improved sizing or grading operation is accomplished with the sleeves having a plurality of spaced annular shoulders in each conformation or means for engaging and supporting the fruit so that a greater range of sizes of fruit is classified. An advantage of the multiple shoulder sleeve is the fact that the same sleeves, without change, are adapted to more efficiently and accurately size fruit of different diameters merely by increasing the minimum spacing between shafts 62. How this is done may be understood readily by reference to FIG. 24. This figure illustrates that the smaller citrus fruits, such as tangerines or lemons, when having a given spherical shape, are engaged and sized by four annular shoulders **164*a*. This size of fruit is determined by the spacing between two successive shafts 62, such spacing being indicated in the figure by the legend "Tangerine or Lemon," which represents the minimum spacing between shafts. In order to size oranges having a greater diameter, the shafts are spaced farther apart as indicated by the legend "Orange." At the increased spacing between shafts 62, a fruit of spherical shape is then engaged and sized by the intermediate annular ridges 164*b***, as shown by the fruit in dotted lines in FIG. 24.

A still further separation of the shafts to the minimum spacing indicated by the legend "Grapefruit" produces a spacing in which a fruit of the size indicated by the dot-dash lines in FIG. 24, is engaged by the third step or the largest annular shoulders **164*c* From this it will be seen that the multiple-step or ridge arrangement of the sleeves 164 permits improved sizing of all different citrus fruit, more especially fruit having sizes ranging from lemons to grapefruit, using the same sleeves 62 and changing only the spacing between the shafts on which the sleeves are mounted. This classifying action of the rollers makes the entire machine extremely versatile in the range of sizes and shapes of fruit that it will handle. Citrus fruits are an extreme example of the ability of the machine to classify into categories that are visually similar, since most grapefruit are oblate, oranges vary from oblate to prolate, and most lemons are prolate. Hence, the modified forms of sleeves 164** make possibly highly satisfactory visual classification of fruits of various sizes and/or shapes.

It will be readily apparent that alterations and modifications in the embodiments of the invention described can be resorted to without departing from the spirit and scope of this invention and that all such alterations and modifications are intended to be included within the scope of the invention defined by the appended claims.

We claim:

1. A fruit sizing machine of the class described comprising: a plurality of parallel shafts transversely spaced from one another and having cooperative fruit sizing means thereon for reception of a fruit therebetween and operable to pass fruit of different sizes between said shafts as the space between said shafts is varied; said shafts on corresponding extremities thereof each having a roller thereon forming a first set of rollers; a second set of rollers positioned above said first set of rollers and lying in a common vertical plane therewith; link means interconnecting said first set of rollers and said second set of rollers; said link means interconnecting said shafts and forming therewith an endless conveyor with said shafts disposed in parallel relation; means supporting said conveyor for endless travel of said shafts; means for driving said conveyor; and means for varying the distance between said sets of rollers as said conveyor is driven to progressively vary the space between said shafts and effect said sizing as said shafts move through said endless travel.

2. A fruit sizing machine of the class described comprising: a plurality of parallel shafts transversely spaced from one another and having cooperative fruit sizing means thereon for reception of a fruit therebetween and operable to pass fruit of different sizes between said shafts as the space between said shafts is varied; said shafts on corresponding extremities thereof each having a roller thereon forming a first set of rollers; a second set of rollers positioned above said first set of rollers and lying in a common vertical plane therewith; link means interconnecting said first set of rollers and said second set of rollers; said link means interconnecting said shafts and forming therewith an endless conveyor with said shafts disposed in parallel relation; means supporting said conveyor for endless travel of said shafts; spaced apart means drivingly engaged with said conveyor for driving said conveyor; and means for varying the distance between said sets of rollers as said conveyor is driven to progressively vary the space between said shafts and effect said sizing as said shafts move through said endless travel.

3. A fruit sizing machine of the class described comprising: a plurality of parallel shafts transversely spaced from one another and having cooperative fruit sizing means thereon for reception of a fruit therebetween and operable to pass fruit of different sizes between said shafts as the space between said shafts is varied; said shafts on corresponding extremities thereof each having a pair of pivotally connected arms thereon; a link positioned between and at one side of each adjacent pair of shafts; one of said arms from each of an adjacent pair of shafts being pivotally connected to one another and to one of said links and forming with said shafts and endless conveyor with said shafts disposed in parallel relation; means supporting said conveyor for endless travel of said shafts; means for driving said conveyor; a roller on each of said links and a roller on the above mentioned extremity of each shaft; said rollers all lying in a common vertical plane; and cam means positioned between said link connected rollers and said shaft connected rollers varying the distance between same upon movement of said rollers along said cam means to effect said sizing.

4. A fruit sizing machine of the class described comprising: a plurality of parallel shafts transversely spaced from one another and having cooperative fruit sizing means thereon for reception of a fruit therebetween and operable to pass fruit of different sizes between said shafts as the space between said shafts is varied; said shafts on corresponding extremities thereof each having a pair of pivotally connected arms thereon; a link positioned between and at one side of each adjacent pair of shafts; one of said arms from each of an adjacent pair of shafts being pivotally connected to one another and to one of said links and forming with said shafts an endless conveyor with said shafts disposed in parallel relation; means supporting said conveyo rfor endless travel of said shafts; means for driving said conveyor; a roller on each of said links and a roller on the above mentioned extremity of each shaft; said rollers all lying in a common vertical plane; cam means positioned between said link connected rollers and said shaft connected rollers varying the distance between same upon movement of said rollers along said cam means to effect said sizing; and a pair of spaced sprocket drive means about which said conveyor extends in an endless path so as to be driven by said drive means.

5. A fruit sizing machine of the class described comprising: a plurality of parallel shafts transversely spaced from one another and having cooperative fruit sizing means thereon for reception of a fruit therebetween and operable to pass fruit of different sizes between said shafts as the space between said shafts is varied; said shafts on corresponding extremities thereof each having a pair of pivotally connected arms thereon; a link positioned between and at one side of each adjacent pair of shafts; one of said arms from each of an adjacent pair of shafts being pivotally connected to one another and to one of said links and forming with said shafts an endless conveyor with said shafts disposed in parallel relation; means supporting said conveyor for endless travel of said shafts; means for driving said conveyor; a roller on each of said links and a roller on the above mentioned extremity of each shaft; said rollers all lying in a common vertical plane; cam means positioned between said link connected rollers and said shaft connected rollers varying the distance between same upon movement of said rollers along said cam means to effect said sizing; and means along a portion of the path of said conveyor engaging and rotating said shafts.

6. A fruit sizing machine of the class described comprising: a plurality of parallel shafts transversely spaced from one another and having cooperative fruit sizing means thereon for reception of a fruit therebetween and operable to pass fruit of different sizes between said shafts as the space between said shafts is varied; said shafts on corresponding extremities thereof each having a pair of pivotally connected arms thereon; a link positioned between and at one side of each adjacent pair of shafts; one of said arms from each of an adjacent pair of shafts being pivotally connected to one another and to one of said links and forming with said shafts an endless conveyor with said shafts disposed in parallel relation; means supporting said conveyor for endless travel of said shafts; means for driving said conveyor; a roller on each of said links and a roller on the above mentioned extremity of each shaft; said rollers all lying in a common vertical plane; cam means positioned in the path of said link connected rollers and said shaft connected rollers varying the distance between same upon movement of said rollers along said cam means to effect said sizing; and said fruit sizing means comprising a plurality of fruit engaging ridges spaced along each shaft and aligned with the ridges on the adjacent shafts, said ridges providing four variably spaced points for supporting a fruit and allowing passage of the fruit therebetween as the space between said shafts varies.

7. A fruit sizing machine of the class described comprising: a plurality of parallel shafts transversely spaced from one another and having cooperative fruit sizing means thereon for reception of a fruit therebetween and operable to pass fruit of different sizes between said shafts as the space between said shafts is varied; said shafts on corresponding extremities thereof each having a pair of pivotally connected arms thereon; a link positioned between and at one side of each adjacent pair of shafts; one of said arms from each of an adjacent pair of shafts being pivotally connected to one of said links; a cam follower on each of said links and a cam follower on the above mentioned extremity of each shaft; a cam track of variable width positioned between said link connected cam followers and said shaft connected cam followers to separate the followers by a variable distance and change the spacing between shafts; said cam followers all engaging said cam track on a common vertical plane, such interconnected shafts and arms forming an endless conveyor; spaced apart sprocket drive means about which said conveyor extends in an endless path with at least a run extended substantially horizontally; means for driving each of said sprocket drive means for engaging and driving said conveyor; said shafts being rotatably mounted with respect to the links and the cam follower mounted thereon; and shaft rotating means along a portion of the path of said conveyor engaging and rotating said shafts.

8. A fruit processing machine of the class described comprising: a plurality of parallel shafts transversely spaced from one another; a plurality of Y-shaped linkages connected to the shafts to form therewith an endless conveyor, each such linkage comprising three elements pivotally interconnected at a common point; cam follower means on each of the three elements at the ends thereof removed from said pivotal interconnection, said cam follower means lying on a common vertical plane; and a rigid cam having two opposed surfaces engaged by said follower means whereby the spacing between said cam surfaces varies the transverse spacing between said shafts, means for supporting and driving said shafts in an endless path including a run extending along said cam; and sizing means on adjacent shafts engageable by fruit and operable to pass fruit between said shafts as the space between said shafts varies.

References Cited by the Examiner

UNITED STATES PATENTS

| | | | |
|---|---|---|---|
| 1,537,603 | 5/1925 | Hale | 101—40 |
| 2,335,164 | 11/1943 | Wayland et al. | 209—106 |
| 2,424,006 | 7/1947 | Verrinder | 101—376 X |
| 2,661,840 | 12/1953 | Ballard et al. | 209—106 |
| 2,714,452 | 8/1955 | Lorence | 209—106 |
| 2,830,531 | 4/1958 | Tarlton | 198—33.1 X |
| 2,917,170 | 12/1959 | Flodin | 209—106 |
| 3,068,785 | 12/1962 | Ahlburg | 101—37 |
| 3,080,955 | 3/1963 | Fennell | 198—183 X |
| 3,091,323 | 5/1963 | Niederer et al. | 198—33.1 |
| 3,120,889 | 2/1964 | Wilksey | 198—183 X |

FOREIGN PATENTS

| | | |
|---|---|---|
| 603,097 | 9/1934 | Germany. |

ROBERT E. PULFREY, *Primary Examiner.*

WILLIAM B. PENN, *Examiner.*